US010462190B1

(12) United States Patent
Myers

(10) Patent No.: US 10,462,190 B1
(45) Date of Patent: Oct. 29, 2019

(54) VIRTUAL ETHERNET TAP

(71) Applicant: Couter Link LLC, Portland, OR (US)

(72) Inventor: Glenford J. Myers, Portland, OR (US)

(73) Assignee: Counter Link LLC, Portland, OR (US)

(*) Notice: Subject to any disclaimer, the term of this patent is extended or adjusted under 35 U.S.C. 154(b) by 0 days.

(21) Appl. No.: 16/398,820

(22) Filed: Apr. 30, 2019

Related U.S. Application Data

(60) Provisional application No. 62/778,205, filed on Dec. 11, 2018.

(51) Int. Cl.
H04L 29/06 (2006.01)
H04L 12/26 (2006.01)
G06F 9/455 (2018.01)
G06Q 50/26 (2012.01)

(52) U.S. Cl.
CPC ........ H04L 63/306 (2013.01); G06F 9/45558 (2013.01); G06Q 50/26 (2013.01); H04L 43/18 (2013.01); H04L 63/1425 (2013.01); H04L 65/1006 (2013.01); H04L 65/1083 (2013.01); G06F 2009/45595 (2013.01)

(58) Field of Classification Search
CPC ...... G06F 9/45558; G06F 2009/45595; G06Q 50/26–265; H04L 43/02–028; H04L 43/12; H04L 43/14; H04L 43/18; H04L 63/1425; H04L 63/30–308; H04L 65/1006; H04L 65/1083
See application file for complete search history.

(56) References Cited

U.S. PATENT DOCUMENTS

| 9,225,747 | B2 | 12/2015 | Fargano et al. |
| 9,692,884 | B2 | 6/2017 | Bennett |
| 9,942,825 | B1* | 4/2018 | Narayanan ............. H04L 63/20 |
| 9,967,292 | B1 | 5/2018 | Higgins et al. |

(Continued)

FOREIGN PATENT DOCUMENTS

EP 1111892 B1 10/2007

OTHER PUBLICATIONS

Cloud Security Auditing based on Behavioral Modeling, 2013 IEEE Ninth World Congress on Services, p. 268-73, Jun. 28, 2013.

(Continued)

Primary Examiner — Kevin Bechtel
(74) Attorney, Agent, or Firm — John R. Kasha; Kelly L. Kasha; Kasha Law LLC

(57) ABSTRACT

Authorized interception information from a warrant of a LEA is received for a target user using an LI network packet probe device connected to a network. A set of criteria for interception is created for the target user from the authorized interception information using the probe. The set of criteria is received from the probe using an LI network packet software application running on a different networked device or virtual machine, connected to the network or a different network, and in communication with the probe. Network traffic is monitored at the Ethernet-frame level to and from the different networked device or virtual machine for packets matching the set of criteria using the application. Copies of information from monitored packets that match the set of criteria for interception are sent to the probe using the application in order to provide intercepted information about the target user to the LEA.

20 Claims, 15 Drawing Sheets

(56) References Cited

U.S. PATENT DOCUMENTS

| | | |
|---|---|---|
| 10,050,847 B2 | 8/2018 | Raney |
| 2008/0276294 A1 | 11/2008 | Brady |
| 2009/0041011 A1 | 2/2009 | Sheppard |
| 2009/0100040 A1 | 4/2009 | Sheppard et al. |
| 2009/0103539 A1 | 4/2009 | Keeler et al. |
| 2011/0145396 A1 | 6/2011 | Kim et al. |
| 2012/0331126 A1 | 12/2012 | Abdul-Razzak et al. |
| 2018/0145995 A1 | 5/2018 | Roeh et al. |
| 2018/0359811 A1 | 12/2018 | Verzun et al. |
| 2019/0018975 A1 | 1/2019 | Goldfarb et al. |

OTHER PUBLICATIONS

Signaling Vulnerabilities in Wiretapping Systems, IEEE Security & Privacy; vol. 3:6; p. 13-25, Dec. 12, 2005.

\* cited by examiner

VIRTUAL ETHERNET TAP

CROSS REFERENCE TO RELATED APPLICATION

This application claims the benefit of U.S. Provisional Patent Application Ser. No. 62/778,205, filed Dec. 11, 2018, the content of which is incorporated by reference herein in its entirety.

INTRODUCTION

The teachings herein relate to systems and methods for legal interception (LI) of network traffic information for at least one target user identified by a law enforcement agency (LEA). More specifically, the listening capability of an LI network packet probe is extended beyond the location of the probe by placing at least one LI network packet software application (e.g., a virtual Ethernet tap (VETap)) that is remotely controlled by the probe in another network or virtual machine of a cloud-based system.

Wiretapping

Wiretapping or tapping is the monitoring of communications among two or more parties by a third party. The term "wiretap" or "tap" is used because originally only telephone conversations were monitored using actual physical electrical wiretaps or taps placed directly on electrical phone lines. See Wikipedia on Telephone Tapping as of Apr. 10, 2019. Today communications among parties are conducted over many other types of communications channels other than electrical phone lines. However, the many different mechanisms for monitoring conversations over these many different types of communications channels continue to be referred to as "wiretaps" or "taps." Hereinafter the term "tap" is used to also refer to "wiretap."

Lawful Tapping

Lawful tapping is an important tool for law enforcement agencies (LEAs) of countries around the world. Many countries have adopted laws that govern the lawful use of taps, while at the same time insuring the privacy of their citizens. In the United States, for example, the Fourth Amendment to the United States Constitution requires a warrant to obtain a tap. Other federal laws governing taps include, but are not limited to, the Foreign Intelligence Surveillance Act (FISA), the Patriot Act, and the Communications Assistance for Law Enforcement Act (CALEA).

In 1994, the U.S. Congress passed CALEA in order to require telecommunications carriers to install technical capabilities in their networks so they can implement court orders for lawful electronic surveillance. CALEA also requires that the public safety goal of the statute must be achieved in a manner that protects the privacy of telecommunications customers and leaves carriers free to launch commercial technologies and services.

Traditional Tapping Technology

As a result of CALEA and advances in communications technology, tapping technology has generally focused on the networks of telecommunications carriers and internet service providers (ISPs). In 1994, CALEA required providers of commercial voice services to engineer their networks to assist LEAs in executing legal interception (LI) orders. In 2005, the Federal Communications Commission (FCC) extended CALEA compliance to include ISPs. As a result, LI orders were further extended to include communications carried over the Internet including, but not limited to, telephone service (e.g., voice over internet protocol (VoIP)), instant messaging, email, file downloads, video clips, streaming services, social networking, and chat.

U.S. Published Patent Application No. 2008/0276294 A1 (hereinafter the "'294 Application"), for example, describes how LI is conventionally performed in the network of an ISP. The network of the ISP described in the '294 Application, like many ISP networks, utilizes dynamically assigned Internet protocol (IP) addresses.

FIG. 1 is an exemplary schematic diagram 100 of the '294 Application showing how an LI is conventionally performed in the network of an ISP that assigns dynamic addresses to users. Network 102 of an ISP includes an edge router 104 for providing access to the Internet, by way of a signal path 120, to users connected to network 102. Such users and their connected devices are represented by the "remainder of the network" 134.

When connecting to network 102, a user communicates with an authentication system 112, by way of signal path 135, layer 2 or 3 switching device 108 and signal paths 128, 130. Authentication system 112 verifies user credentials, such as a correct username and password, and assigns connection information, including an IP address. Once a user is authenticated and connected to the network, user data traffic for the internet is conveyed by way of signal path 135, the layer 2 or 3 switching device 108, and signal paths 124, 122 to edge router 104.

Diagram 100 also includes facilities for performing LI of a target user. An LEA 158 communicates with a mediation system 154 by way of signal path 156. One such commercially available mediation system is provided by SUBSENTIO of Centennial, Colo. To initiate a legal intercept of a target user, the LEA provides warrant information which identifies the target of the warrant, described herein as the target user. The target user identifying information is entered into mediation system 154, typically by a human operator using console terminal 155, for example. The general role of mediation system 154 includes providing target user address information to other devices in the network, collecting the intercepted data, and presenting it to the LEA in an accepted format.

To proceed with the LI, mediation system 154 initially provides a target user identifier to probe device 114, which determines if the target user is connected to the network, and if so, ascertains a network address for the target user, and filters data traffic at this address to accomplish the intercept. In network 102, the Radius DNS server 112 provides a user database which is accessed to authenticate a user. Queries by other portions of the network to this database, and responses generated in reply thereto, are conveyed over signal paths 128, 130 and are passed through tap device 110, which directs a copy of such traffic by way of signal path 132 to probe device 114. The tap device 110 intercepts this traffic without interfering with the communication or timing of the traffic between layer 2 or 3 switching device 108 and Radius DNS server 112.

Probe device 114 is able to ascertain whether a given user is connected to the network, and also ascertain the network address of any connected user, by watching (i.e., "sniffing") the traffic into and out of Radius DNS server 112, and maintaining log files of all user traffic. In addition, probe device 114 receives a "copy" of all traffic passing through tap device 106, either to or from edge router 104, by way of high-bandwidth signal path 126. If the target user is connected to the network 102, probe device 114 can initiate an intercept of the target user's data traffic passing through tap device 106 by filtering any traffic associated with the network address identifier for the target user that is conveyed to probe device 114 using signal path 126. The intercepted data is conveyed to mediation system 154 using signal path 136. The data is then formatted into one of several acceptable formats and either stored for later retrieval, or provided immediately to LEA 158.

Mediation system 154 may be located, as is shown in FIG. 1, within a central administration site 152 which can control intercepts in more than one network. For example, a second network 142 is depicted which communicates with mediation system 154 using a signal path 144. The logical signal paths 136, 144 are typically encrypted to prevent unauthorized access to the intercepted data, as well as to provide for secrecy as to the intended target of the intercept, and possibly to conceal that an intercept is even in progress or imminent. Typically, such logical paths are implemented using VPN tunnels through the public internet, and may physically traverse signal path 120 to enter the network 102.

Because of the tap/probe architecture of this system for providing Us, the magnitude of network traffic that must be sniffed inevitably requires that the probe device 114 be local to the network. This arises because all traffic passing through the tap device 106 must be "tapped" and conveyed to probe device 114, and all traffic passing through tap device 110 must also be "tapped" and conveyed to probe device 114. As such, both signal paths 126, 132 must be extremely high bandwidth signal paths, which makes locating probe device 114 within the network a veritable requirement of this configuration. Moreover, each network that is configured for LI requires its own set of tap devices 106, 110 and its own probe device 114, which can together represent a significant capital cost for each network.

Cloud-Based Tapping Technology

Most recently, the movement of telecommunications carriers and ISPs to cloud-based computer and network systems has provided new technological challenges to LI. For example, U.S. Pat. No. 9,225,747 B2 (hereinafter the "'747 Patent") has outlined some of these technological challenges. The '747 Patent describes that often an LEA is provided with a full broadband LI with all of the content/streams/sessions of a target user. However, for example, the LEA may only be interested in the target user's email and not the target user's video streaming of movies, for example.

Also, the '747 Patent describes that in the cloud environment different communications applications (e.g., VoIP, chat, email, etc.) of a target user are distributed across multiple virtual machines, across multiple actual computers, or even across multiple networks. As a result, even if the LEA is interested in the entire broadband stream of a target user, it is not available in one place. This use of cloud computing and networking multiplies the resources need for LI. In other words, hardware taps and probes, such as those shown in FIG. 1, are needed for each of the communications applications spread across the cloud computing and networking environment. This, of course, multiplies the complexity and cost of providing an LI.

The '747 Patent's solution to some of the technological challenges imposed on LI by the movement of telecommunications carriers and ISPs to cloud-based computer and network systems is an LI software application (App) in the cloud. More specifically, this LI software App includes a well described application programming interface (API) to allow the LI software App to send and receive information about a target user directly from the different communications applications (e.g., VoIP, chat, email, etc.) found in cloud-based computer and network systems, in other words, the developers of the different communications applications (e.g., VoIP, chat, email, etc.) can include in their applications the ability to receive identifying information about a target user and in response send the data of the target user to the LI software App using the API of the LI software App.

FIG. 2 is an exemplary schematic diagram 200 showing the LI software App of the '747 Patent. Diagram 200 shows that LI software App 205 includes API 210, delivery function 220, collector front end 225, and non-safe-harbor collector 230. API 210 provides an interface to exchange data with different communications building blocks (CBBs) 215. Examples of different CBBs 215 include an online chat function, a text messaging function, a voice function (e.g., packet voice), a video function, a multimedia function, and/or the like. API 210 provides a set of exposed methods that developer of CBBs 215 can use to provide intercept data.

Delivery function 220 of LI software App 205 delivers intercept data to collector front end function 225. Collector front end function 225 can provide non-safe-harbor intercept data to non-safe-harbor collector 230, for example. Collector front end function 225 can provide safe-harbor intercept data to safe-harbor collector 235 that can be located at an authorized facility of a LEA.

The '747 Patent also describes using API 210 to interface with other communication technologies other than CBBs 215.

FIG. 3 is an exemplary schematic diagram 300 showing the LI software App of the '747 Patent interfacing with other communication technologies. Specifically, diagram 300 shows API 310 of LI software App 305 interfacing with probe adapter 315. Probe adapter 315 is configured to obtain intercept data from hardware devices 320 including a tablet computer, a smart phone, a mobile phone, a portable gaming device, a music player, a video player, a laptop computer, a desktop computer, a set-top box, a television, a vehicle's on-board system computer(s), a server, a database, a non-database data storage device, and/or the like. Probe adapter 315 can include hardware adapters and can interface with hardware similar to a traditional intercept probe, except that the probe adapter further interfaces with API 310.

FIGS. 2 and 3 show that the '747 Patent is directed an LI software App that replaces the traditional hardware probe of FIG. 1, for example. In addition, the LI software App of the '747 Patent does not gather intercept data directly. Instead it relies on developers of different communications applications (e.g., VoIP, chat, email, etc.) and traditional hardware probes to build interfaces to the API of the LI software App in order to obtain intercept data.

Although the LI software App of the '747 Patent addresses some of the technological challenges imposed on LI by cloud-based computer and network systems it also introduces other problems. First of all, it requires all of the developers of different communications applications (e.g., VoIP, chat, email, etc.) for telecommunications carriers and ISPs to create interfaces to the API of the LI software App.

In addition, different mediation systems may have different LI software Apps. As a result, either a standard API for all LI software Apps must be created or developers of different communications applications (e.g., VoIP, chat, email, etc.) will have to build multiple interfaces for multiple APIs.

Further, as described above, e LI software App of the '747 Patent essentially replaces the traditional hardware probe of FIG. 1 and sends intercept data directly to the LEA. As a result, it must include the LEA communication functions already found in traditional hardware probes. In other words, although the LI software App of the '747 Patent can interface with traditional hardware probes, it must also include redundant features for communicating directly with LEAs.

As a result, additional system and methods are needed to address the technological challenges imposed on LI by cloud-based computer and network systems.

SUMMARY

A system, method, and computer program product are disclosed for extending the listening capability of an LI network packet probe beyond the location of the probe. The system includes at least one LI network packet software application (e.g., virtual Ethernet tap (VETap)) and an LI network packet probe device.

The probe is connected to a network. The probe receives authorized interception information from a warrant of an LEA for at least one target user identified in the warrant. The probe creates a set of criteria for interception from the authorized interception information.

The software application is running on a different networked device or a different virtual machine from the probe. The software application is connected to the network or can be connected to a different network. The software application communicates with the probe.

The software application receives the set of criteria for interception from the probe for the at least one target user. The software application monitors network traffic at the Ethernet-frame level to and from the different networked device or virtual machine for packets matching the set of criteria for interception. The software application sends copies of information from monitored packets that match the set of criteria for interception to the probe in order to provide intercepted information about the at least one target user to the LEA.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1:
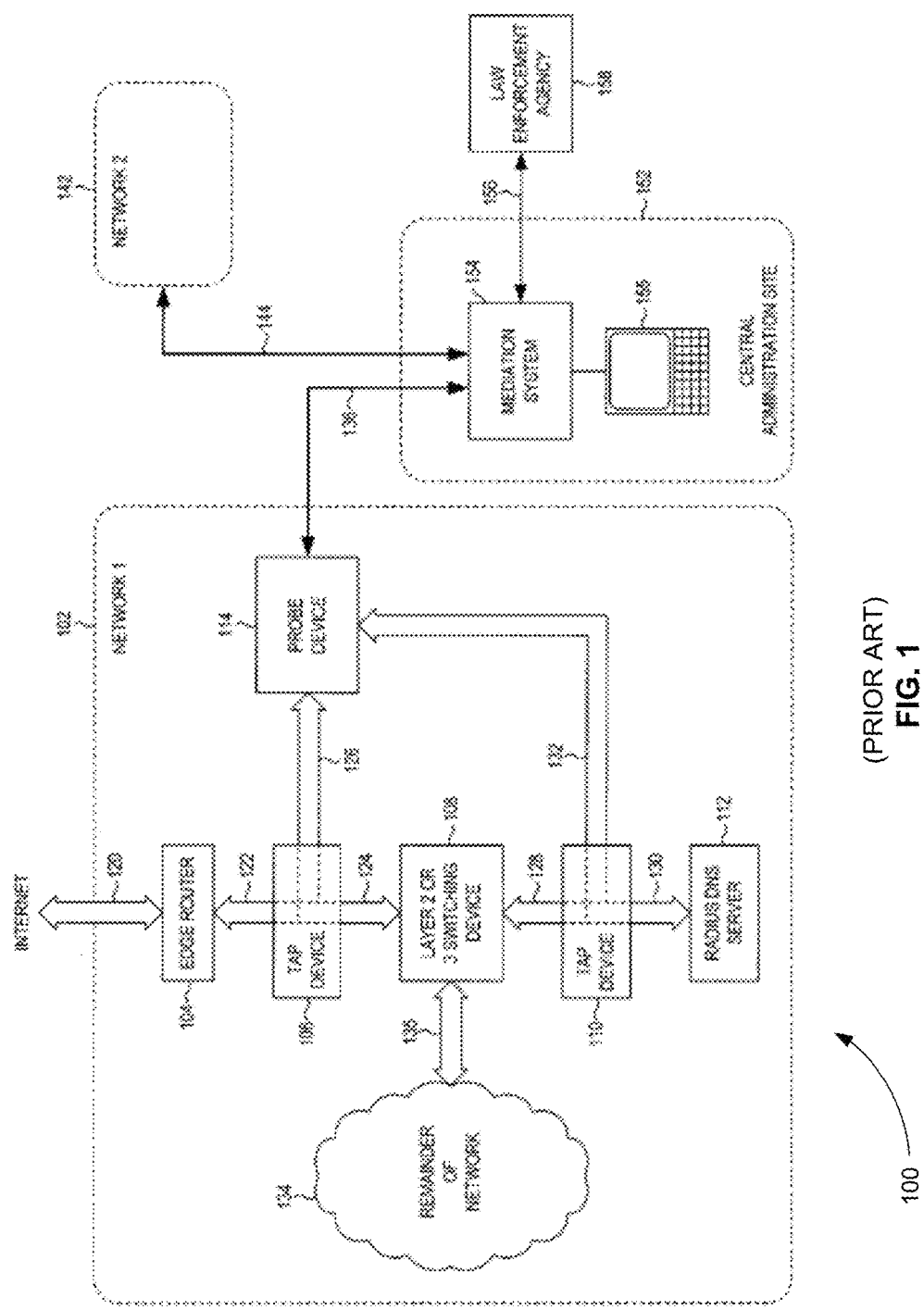
FIG. 1 is an exemplary schematic diagram of the '294 Application showing how an LI is conventionally performed in the network of an ISP that assigns dynamic addresses to users.
Figure 2:
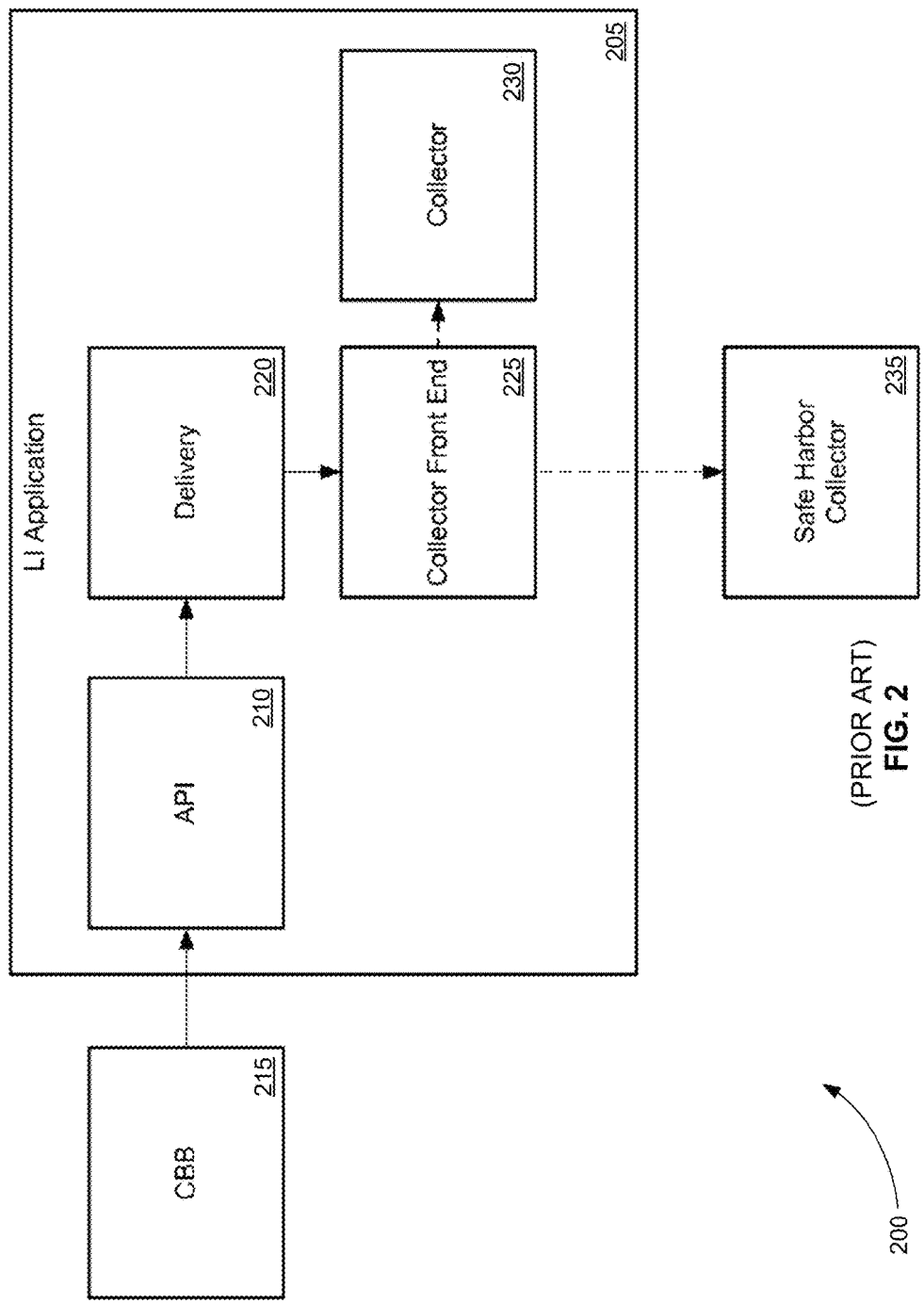
FIG. 2 is an exemplary schematic diagram showing e LI software App of the '747 Patent.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 4:
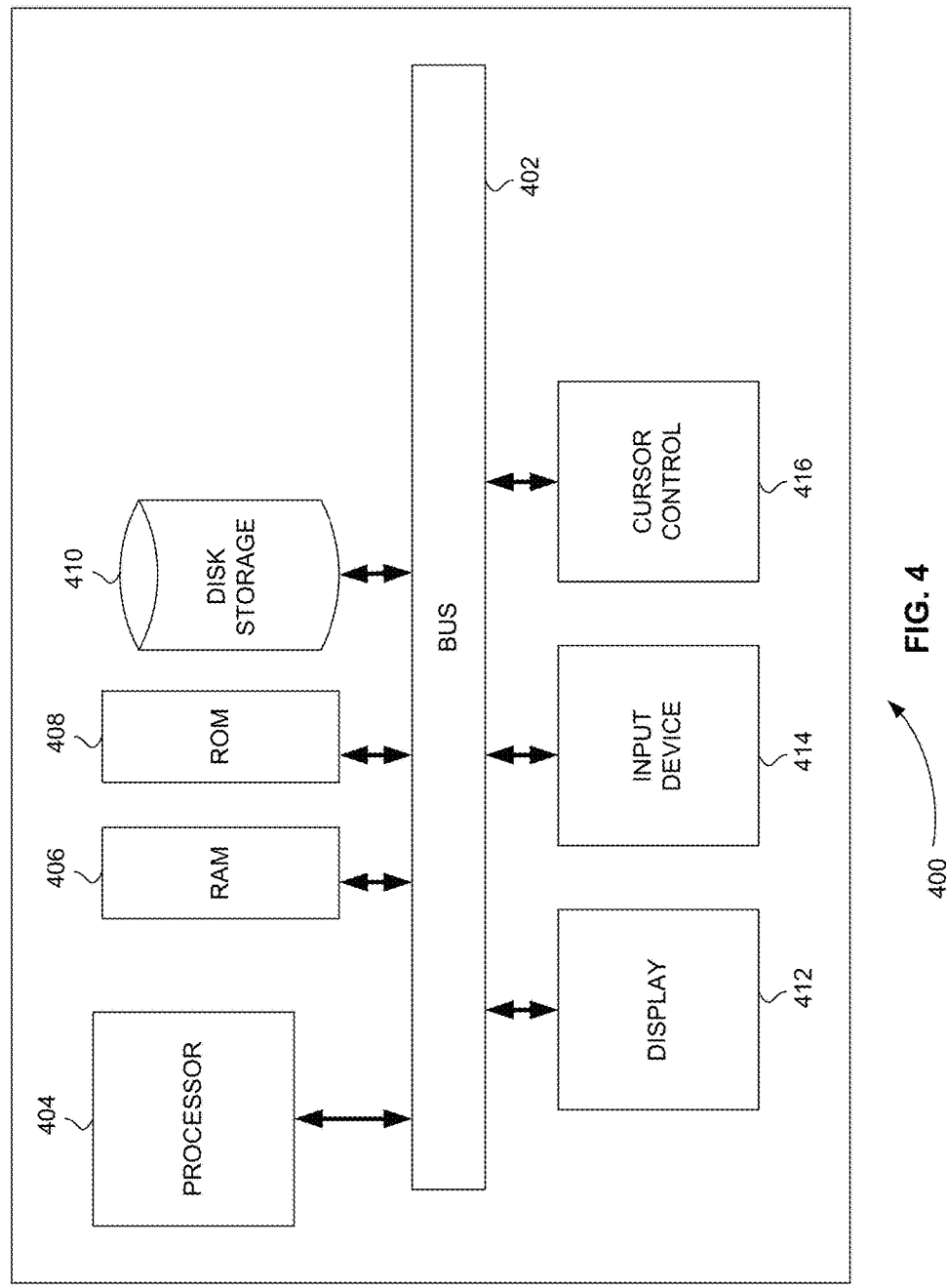
FIG. 4 is a block diagram that illustrates a computer system, upon which embodiments of the present teachings may be implemented.

FIG. 4 is a block diagram that illustrates a computer system 400, upon which embodiments of the present teachings may be implemented. Computer system 400 includes a bus 402 or other communication mechanism for communicating information, and a processor 404 coupled with bus 402 for processing information. Computer system 400 also includes a memory 406, which can be a random-access memory (RAM) or other dynamic storage device, coupled to bus 402 for storing instructions to be executed by processor 404. Memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball or cursor direction keys for communicating direction information and command selections to processor 404 and for controlling cursor movement on display 412. This input device typically has two degrees of freedom in two axes, a first axis (i.e., x) and a second axis (i.e., y), that allows the device to specify positions in a plane.

A computer system 400 can perform the present teachings. Consistent with certain implementations of the present teachings, results are provided by computer system 400 in response to processor 404 executing one or more sequences of one or more instructions contained in memory 406. Such instructions may be read into memory 406 from another computer-readable medium, such as storage device 410. Execution of the sequences of instructions contained in memory 406 causes processor 404 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 400 can be connected to one or more other computer systems, like computer system 400, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as memory 406. Transmission media includes coaxial cables, copper wire, and fiber optics, including the wires that comprise bus 402.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 404 for execution. For example, the instructions may initially be carried on the magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector coupled to bus 402 can receive the data carried in the infra-red signal and place the data on bus 402. Bus 402 carries the data to memory 406, from which processor 404 retrieves and executes the instructions. The instructions received by memory 406 may optionally be stored on storage device 410 either before or after execution by processor 404.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Software Surrogate for an Intercept Probe

As described above, the movement of telecommunications carriers and ISPs to cloud-based computer and network systems has provided new technological challenges to LI. The '747 Patent, for example, addresses some of these technological challenges by replacing the traditional hardware probe with an LI software App. The LI software App does not gather intercept data directly. Instead it relies on developers of different communications applications e.g., VoIP, chat, email, etc.) and traditional hardware probes to build interfaces to the API of the LI software App in order to obtain intercept data.

Although the LI software App of the '747 Patent addresses some of the technological challenges imposed on LI by cloud-based computer and network systems it also introduces other problems. It requires all of the developers of different communications applications to create interfaces to its API. It requires either a standard API for all LI software Apps or it requires developers of different communications applications to build multiple interfaces for different APIs. Finally, it must include LEA communication functions already found in traditional hardware probes. As a result, additional system and methods are needed to address the technological challenges imposed on LI by cloud-based computer and network systems.

In various embodiments, a virtual ethernet tap (VETap) extends the listening capability of a lawful-intercept hardware probe beyond the specific geographical (or virtual) location of the probe. A VETap is a software module or App. There are many situations, for cost, network layout, and other reasons, where it is desirable for an interception probe to have remote intelligent surrogates that can extend the listening points of the probe beyond its immediate vicinity. This is provided by the VETap. The VETap can be used in a variety of configurations, such as placed in virtual machines in a cloud-service environment (where physical taps are precluded); placed in network devices to be monitored, such as VoIP SBCs; or even placed alone in a physical device having network interfaces, allowing that device to be a remote surrogate of the probe, or a "subprobe."

A probe can remotely control one, a fixed number, or a dynamic number of VETaps. A probe remotely controls one or more VETaps using a proprietary protocol between the probe and the VETaps. A probe dynamically instructs the VETaps to look for certain types of network traffic, such as the signaling for a phone call to or from a target use, Internet traffic to or from a specific IP address, or network login from a specified user identifier.

Bidirectional communications between VETaps and a probe are used to accomplish an interception. For instance, if the probe needs to intercept the signaling and media of a specific phone number or identifier, the VETap first sends the discovered signaling to the probe. The probe then inspects the signaling and discovers the IP addressing information associated with the media and sends this to the VETaps, at which time the VETaps looks for and sends to the probe any network packets matching that IP addressing information.

Figure 5:
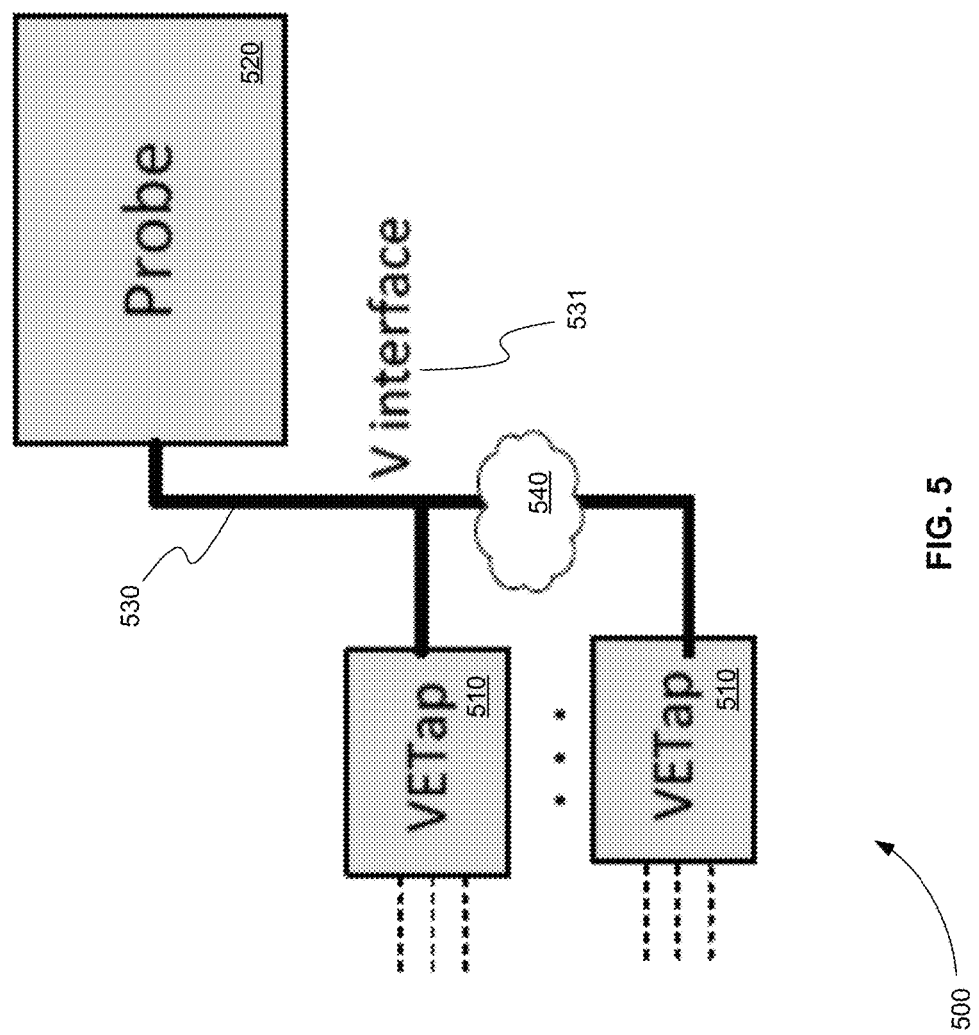
FIG. 5 is an exemplary schematic diagram showing the relationship between one or more VETaps and an interception probe, in accordance with various embodiments.

FIG. 5 is an exemplary schematic diagram 500 showing the relationship between one or more VETaps and an interception probe, in accordance with various embodiments. One or more software VETaps 510 communicate with hardware probe 520 over Internet protocol (IP) network 530 using a proprietary layer or protocol called V interface or protocol 531. One or more VETaps 510 are typically located remotely from probe 520, and, as indicated, are often separated from probe 520 by a cloud 540 of some type. One or more VETaps 510 are provisioned (via a configuration file) with the IP address of probe 520, and thus they are dynamically discovered by probe 520 as they start or wake up and notify probe 520 of their existence.

In various embodiments, there are three types of communications sent using V interface 531: (1) commands from probe 520, (2) command responses and other notifications from one or more VETaps 510, and (3) intercepted traffic sent from one or more VETaps 510. Commands from probe 520 tell a VETap 510 to enable or disable itself, to send statistics to probe 520, to send its log, to enable/disable encryption, and to use a supplied set of specific criteria for interception (e.g., an IP address, a phone number, a request to send all dynamic host configuration protocol (DHCP) packets to the probe, etc.).

In addition to responding to requests for statistics and log, a VETap 510 periodically sends a "notify" message to probe 520, letting probe 520 know of the existence of VETap 510. If VETap 510 first makes itself visible to probe 510 while intercepts are active, probe 520 immediately activates that VETap 510 and provides it with the set of specific criteria for interception.

Intercepted traffic is sent on V interface 531 encapsulated in transmission control protocol (TCP) for reliable delivery. In various embodiments, end-to-end encryption is enabled for this, although cleartext is an option available for troubleshooting.

VETap 510's configuration file tells it, among other things, which network interfaces of the underlying machine are to be tapped and which is used for V interface 531.

FIG. 5 shows that one or more VETaps 510 are controlled by probe 520. Probe 520 then, in turn, communicates the information received from one or more VETaps 510 through a mediation system (not shown) or directly to an LEA (not shown). As a result, the LEA communication functions are provided by probe 520. One or more VETaps 510 do not need to include LEA communication functions. They are reliant on probe 520, which has traditionally provided such communication for these functions.

Figure 3:
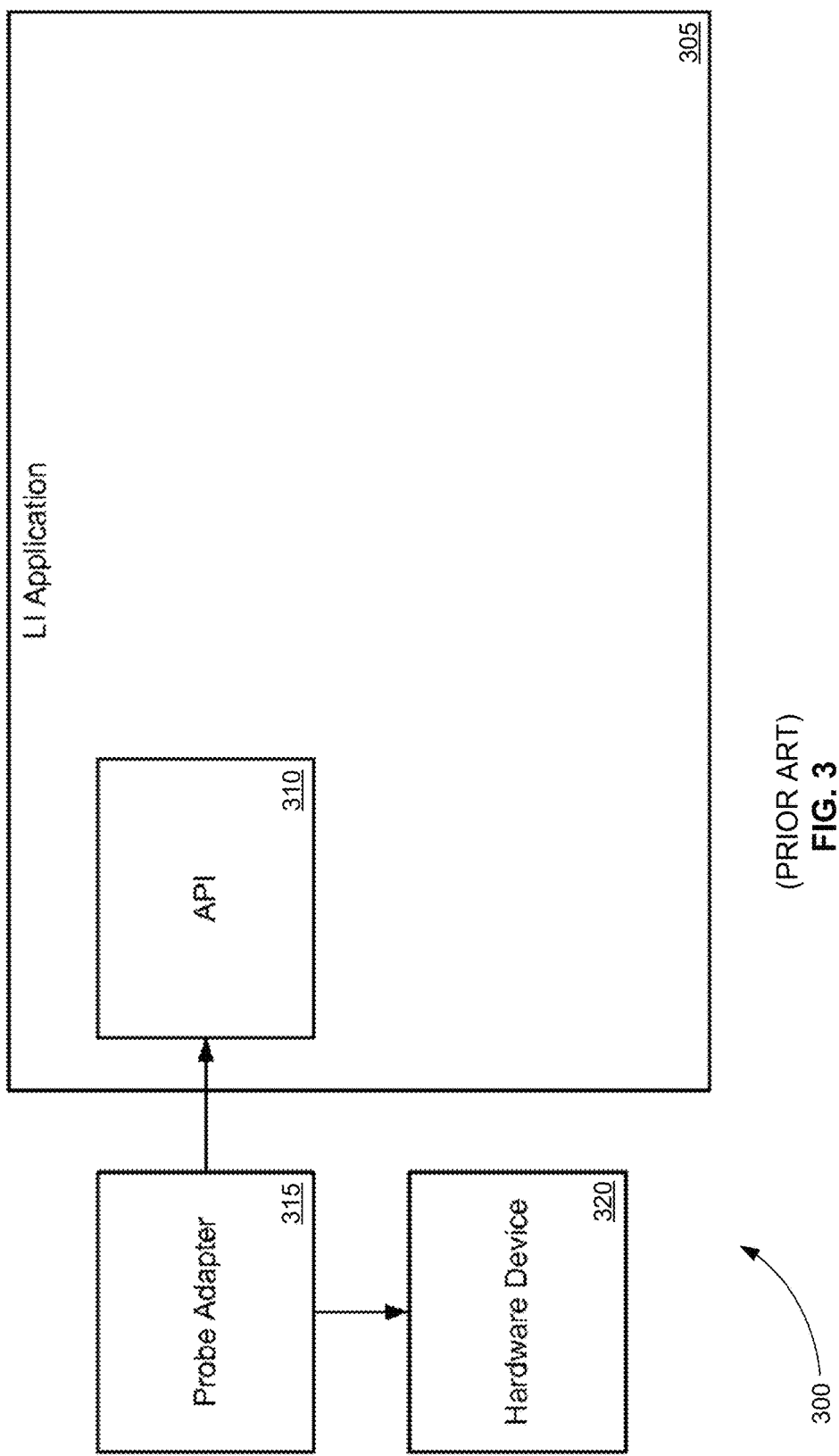
FIG. 3 is an exemplary schematic diagram showing the LI software App of the '747 Patent interfacing with other communication technologies.

Consequently, one or more VETaps 510 address one of the deficiencies of the LI software App of the '747 Patent described above. Because they are controlled by probe 520, they can rely on probe 520 for communications with the LEA. In contrast and as shown in FIG. 3, the LI software App of the '747 Patent controls one or more traditional intercept probes (hardware device 320 can be a traditional intercept probe) and must include redundant communications functions in order to send intercept data to the LEA.

Figure 6:
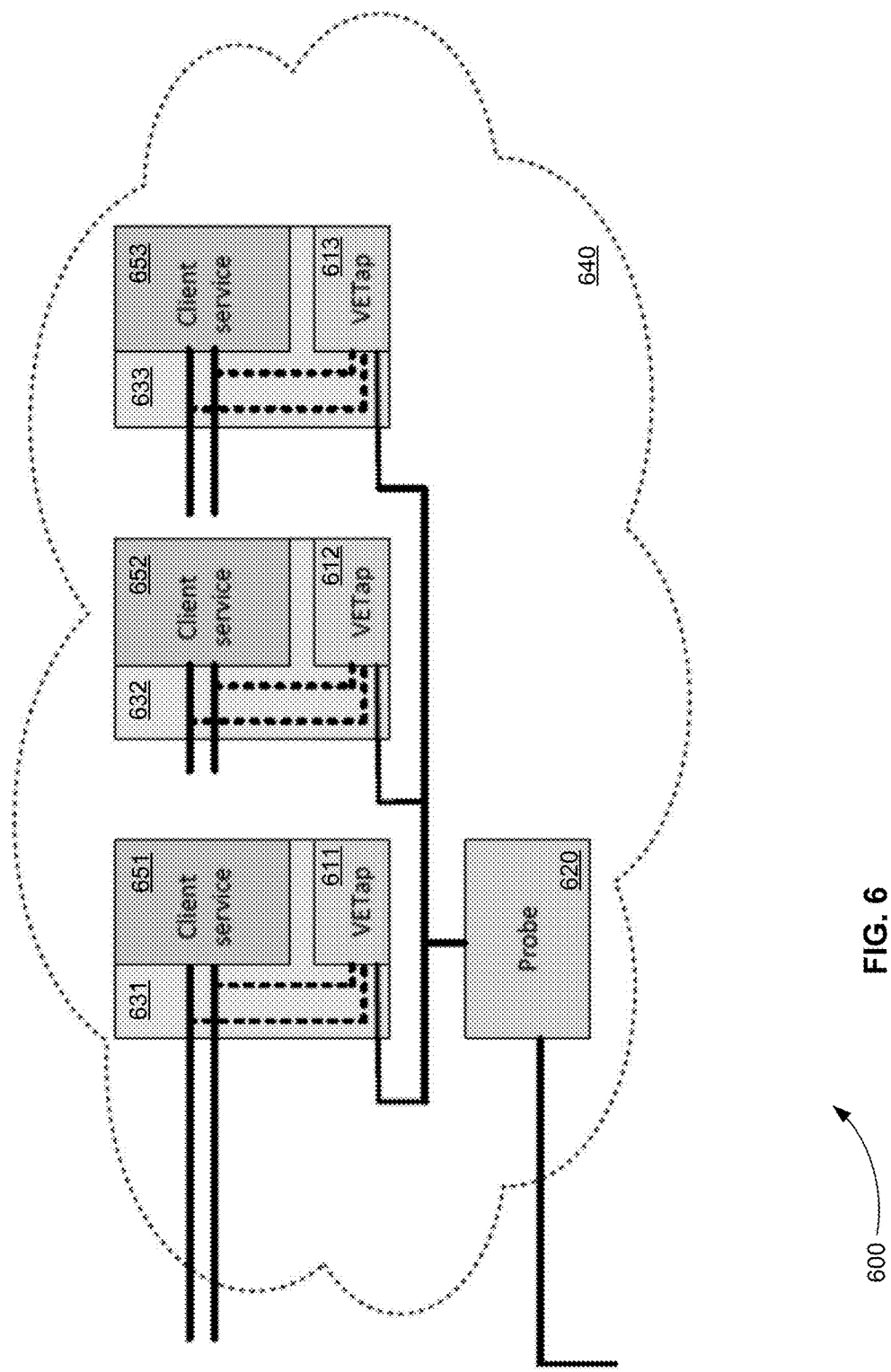
FIG. 6 is an exemplary schematic diagram showing three different VETaps being used to tap network interfaces in three different virtual machines of a cloud-based system where the VETaps and the probe are in the same virtual private cloud, in accordance with various embodiments.

FIG. 6 is an exemplary schematic diagram 600 showing three different VETaps being used to tap network interfaces in three different virtual machines of a cloud-based system where the VETaps and the probe are in the same virtual private cloud, in accordance with various embodiments. In diagram 600, VETap 611 is used to tap a network interface of virtual machine 631, VETap 612 is used to tap a network interface of virtual machine 632, and VETap 613 is used to tap a network interface of virtual machine 633. Virtual machines 631, 632, and 633 are all part of cloud-based system 640. Probe 620 controls VETaps 611, 612, and 613.

In various embodiments, probe 620 is also located in cloud-based system 640. Probe 620 can be part of another virtual machine (not shown) of cloud-based system 640. Using Amazon web services (AWS) terminology, probe 620 and VETaps 611, 612, and 613 are in the same virtual private cloud 640. This means, for example, that probe 620 and VETaps 611, 612, and 613 share the same address space and same access and security rules.

The dotted lines in diagram 600 show that VETaps 611, 612, and 613 are directly tapping the network interfaces of virtual machines 631, 632, and 633, respectively. As a result, VETaps are an improvement over the LI software App of the '747 Patent. VETaps 611, 612, and 613 do not need to receive intercept data from client services 651, 652, and 653, respectively, and the developers of these services do not need to provide API interfaces to VETaps 611, 612, and 613. VETaps like 611, 612, and 613 are, therefore, more easily deployed in existing cloud-based systems of telecommunication companies and ISPs. Further, the use of VETaps like 611, 612, and 613 does not require the adoption of a common API for all mediation systems.

Figure 7:
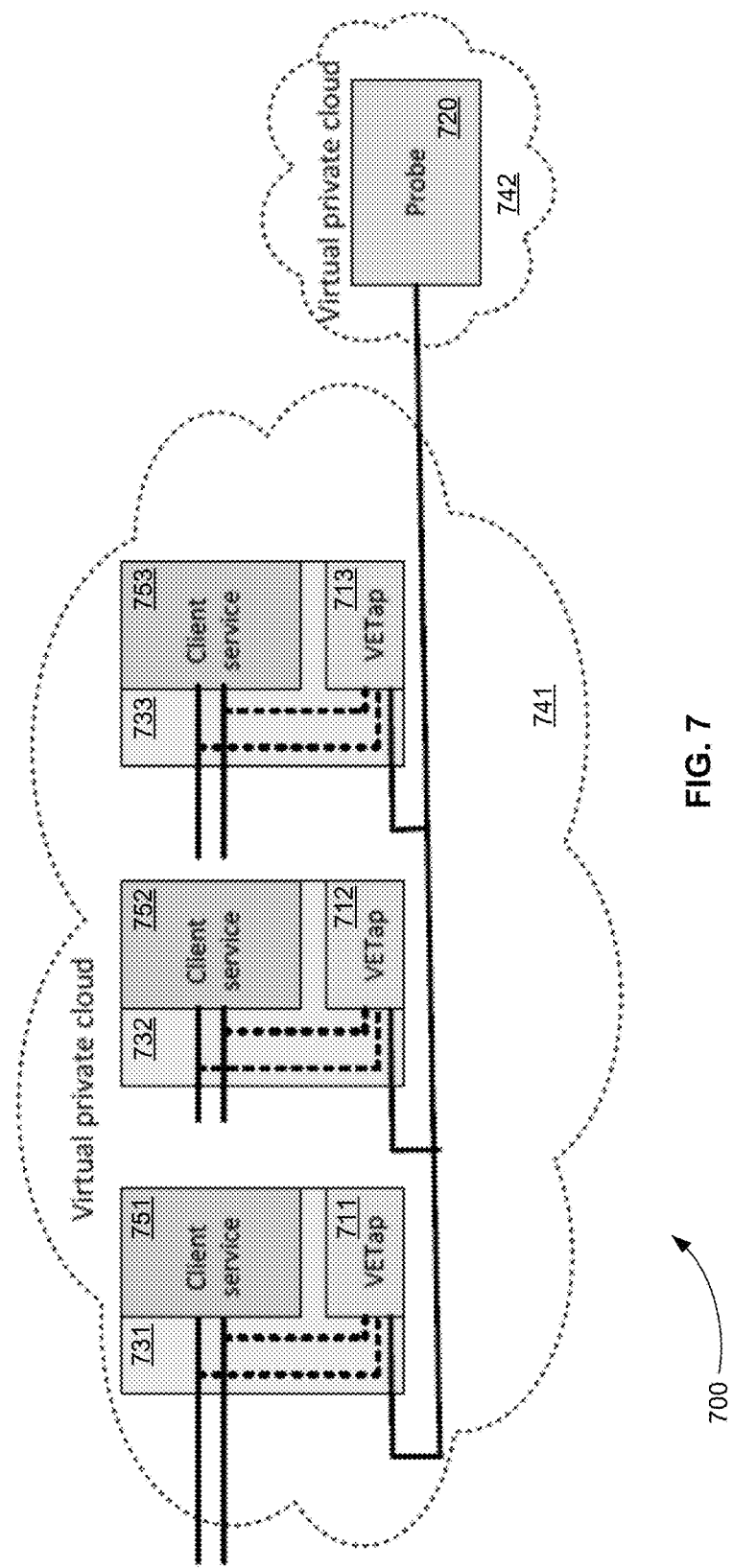
FIG. 7 is an exemplary schematic diagram showing three different VETaps being used to tap network interfaces in three different virtual machines of a cloud-based system where the VETaps and the probe are in separate virtual private clouds, in accordance with various embodiments.

FIG. 7 is an exemplary schematic diagram 700 showing three different VETaps being used to tap network interfaces in three different virtual machines of a cloud-based system where the VETaps and the probe are in separate virtual private clouds, in accordance with various embodiments. In diagram 700, VETap 711 is used to tap a network interface of virtual machine 731, VETap 712 is used to tap a network interface of virtual machine 732, and VETap 713 is used to tap a network interface of virtual machine 733. Virtual machines 731, 732, and 733 are all part of virtual private cloud 741. Probe 720 controls VETaps 711, 712, and 713.

In various embodiments, probe 720 is located in a separate virtual private cloud 742. Probe 720 and VETaps 711, 712, and 713 are, therefore, in separate virtual private clouds 741 and 742. This means, for example, that probe 720 and VETaps 711, 712, and 713 do not share the same address space and same access and security rules. Virtual private clouds 741 and 742 are connected, for example using an AWS peering connection.

In various embodiments, the VETap software can be installed, along with Linux, in a server platform having n network interfaces, and the configuration file can tell the VETap to tap n-1 of the interfaces and use the remaining interface for the V interface. Such a physical entity can be called a subprobe, truly a remote surrogate of the probe.

In various embodiments, a VETap is used for VoIP intercept. For VoIP intercept a number of different modes of operation can be used.

Figure 8:
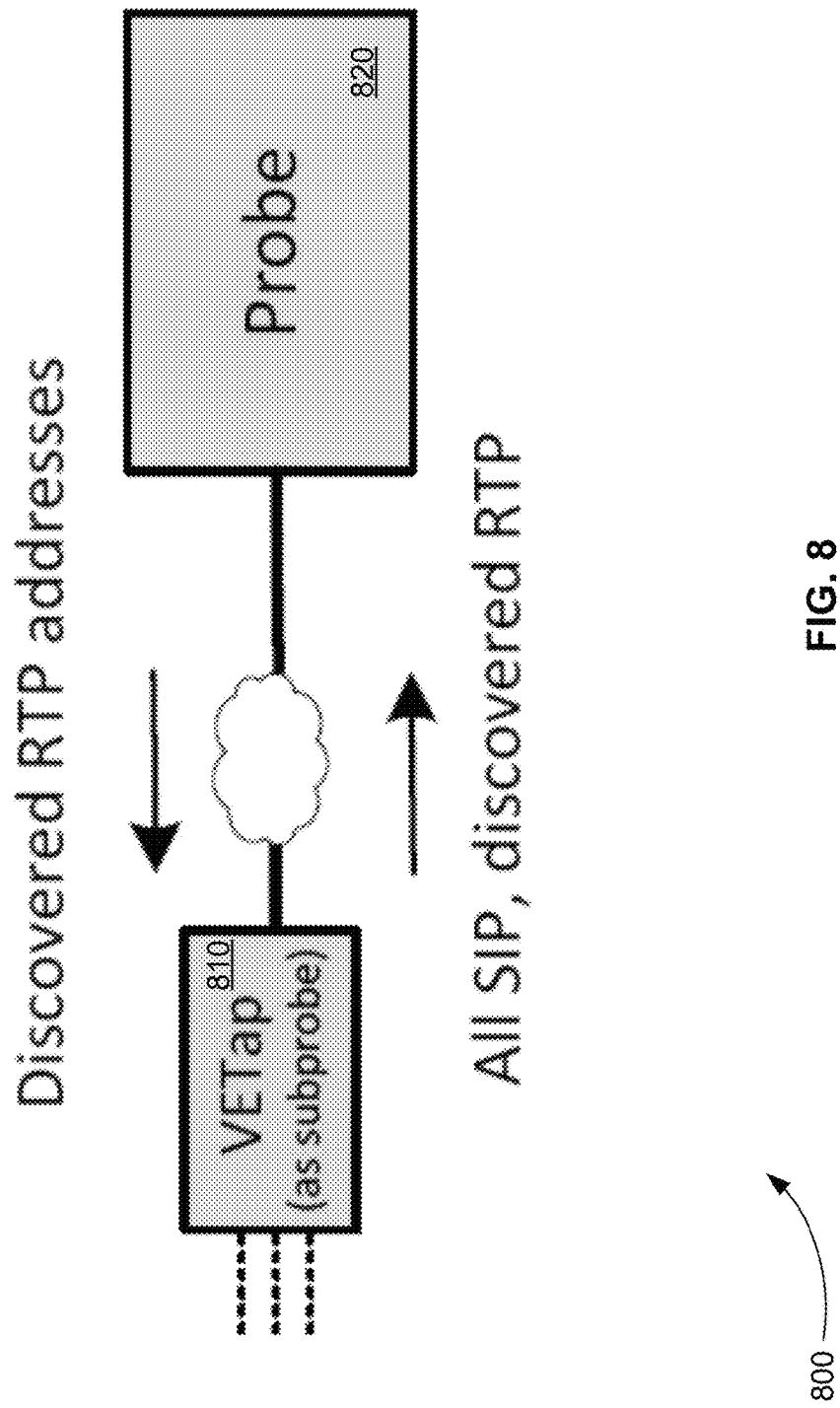
FIG. 8 is an exemplary schematic diagram showing VoIP intercept using a VETap and a probe where all session initiation protocol (SIP) packets are intercepted by the VETap and sent to the probe, in accordance with various embodiments.

FIG. 8 is an exemplary schematic diagram 800 showing VoIP intercept using a VETap and a probe where all session initiation protocol (SIP) packets are intercepted by the VETap and sent to the probe, in accordance with various embodiments. Diagram 800 depicts a mode of operation in which, if probe 820 has one or more active VoIP intercept targets, probe 820 directs all connected VETaps 810 to send to probe 820 everything that has the appearance of a session initiation protocol (SIP) packet. SIP is a signaling protocol used for initiating, maintaining, and terminating real-time sessions that include voice, video and messaging. See Wikipedia on Session Initiation Protocol as of Apr. 10, 2019.

In this mode of operation, the majority of the processing occurs in probe 820. Specifically, probe 820 determines that there is specific real-time transport protocol (RTP) media to be captured for an intercepted call. RTP is a network protocol for delivering audio and video over IP networks. See Wikipedia on Real-time Transport Protocol as of Apr. 10, 2019. If so probe 820 sends the specifics of the RTP streams to one or more VETaps 810. In response, one or more VETaps 810 send all SIP packets of the specified RTP streams to probe 820.

Figure 9:
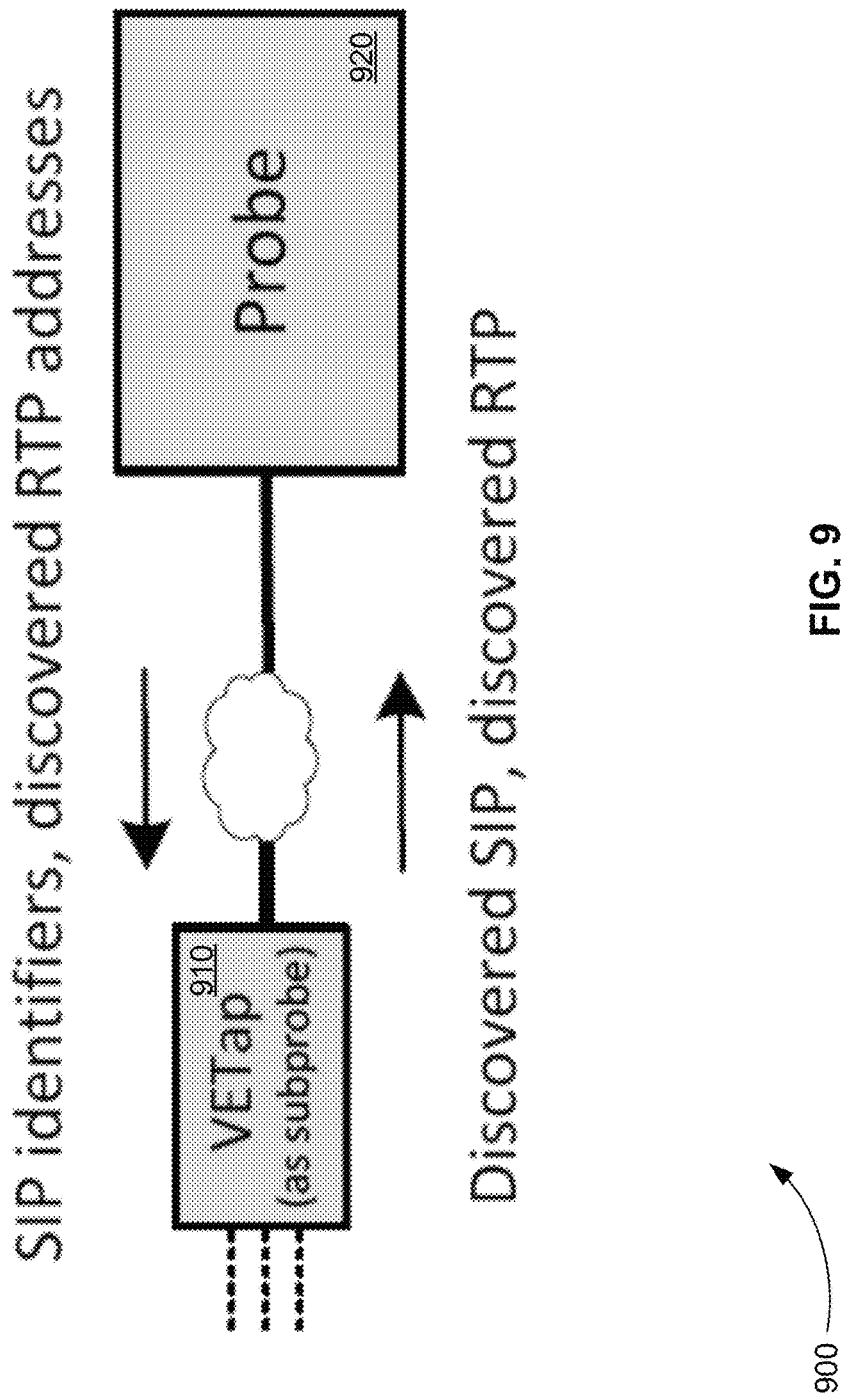
FIG. 9 is an exemplary schematic diagram showing VoIP intercept using a VETap and a probe where all SIP packets are intercepted by the VETap, but only those packets matching identifiers received from the probe are sent back to the probe, in accordance with various embodiments.

FIG. 9 is an exemplary schematic diagram 900 showing VoIP intercept using a VETap and a probe where all SIP packets are intercepted by the VETap, but only those packets matching identifiers received from the probe are sent back to the probe, in accordance with various embodiments. Diagram 900 depicts a mode of operation that moves more processing to one or more VETaps 910. Here, probe 920 sends to one or more VETaps 910 the identifiers (e.g., phone numbers) of the provisioned intercepts. One or more VETaps 910 do a deep-packet inspection on SIP packets to determine if they match. If a SIP packet matches an identifier, one or more VETaps 910 forward the SIP packet to probe 920.

In this mode of operation, probe 920 also initially determines if there is specific RTP media to be captured for an intercepted call. If so, probe 920 sends the specifics of the RTP streams to one or more VETaps 910 along with the SIP identifiers.

Figure 10:
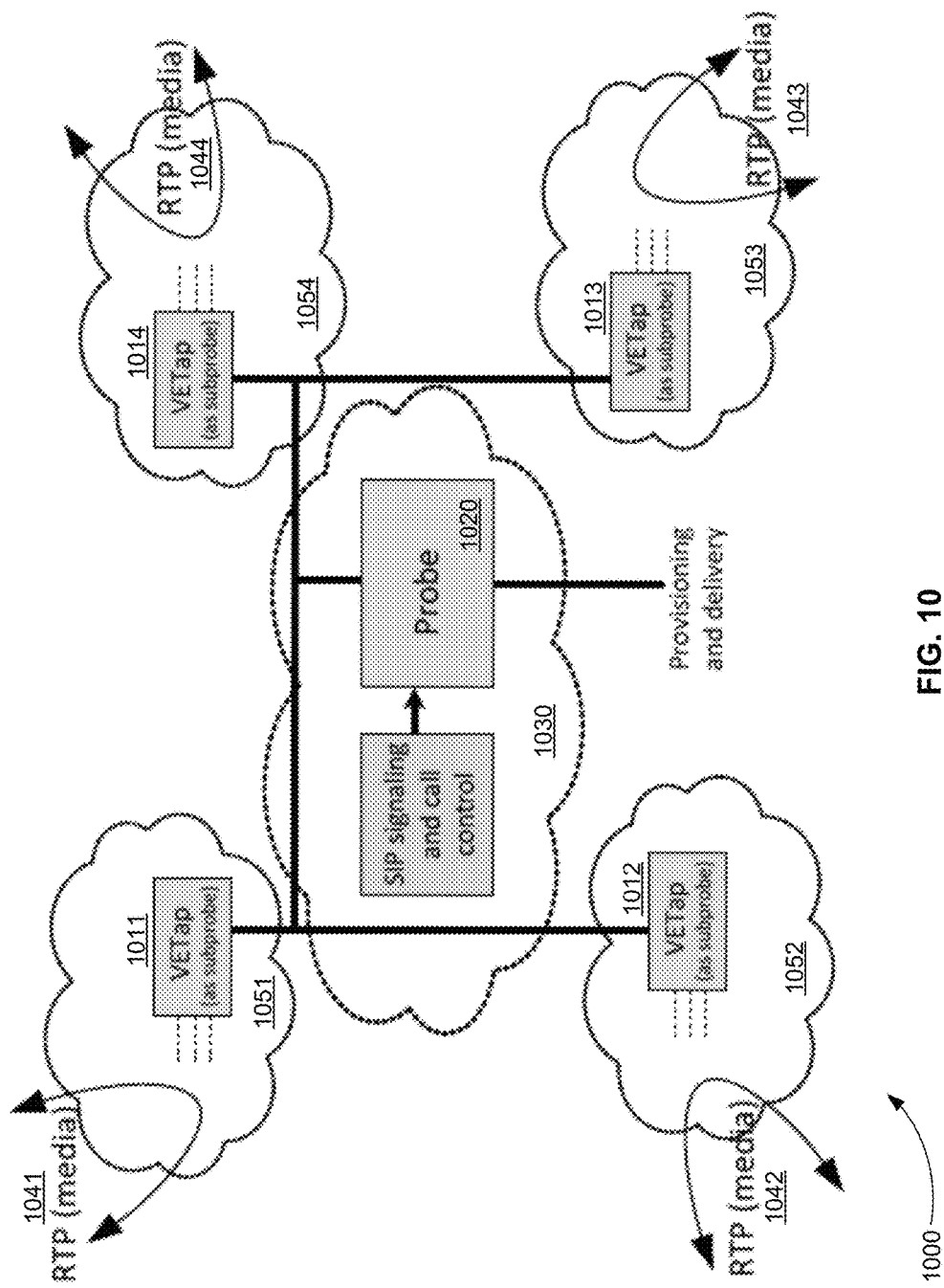
FIG. 10 is an exemplary schematic diagram showing VoIP intercept using one or more VETaps and probe where SIP signaling is processed in a central location of a network but the media do not come to the central location and are instead located and intercepted in dispersed gateways, in accordance with various embodiments.

FIG. 10 is an exemplary schematic diagram 1000 showing VoIP intercept using one or more VETaps and probe where SIP signaling is processed in a central location of a network but the media do not come to the central location and are instead located and intercepted in dispersed gateways, in accordance with various embodiments. Diagram 1000 depicts a mode of operation where SIP signaling is processed in central location 1030 of a network. Probe 1020 is placed in central location 1030 to listen to all SIP traffic. Media 1041, 1042, 1043, and 1044 do not, however, come to central location 1030. Instead media streams 1041, 1042, 1043, and 1044 are handled in remotely gateways 1051, 1052, 1053, and 1054, respectively. In order to capture media streams 1041, 1042, 1043, and 1044, VETaps 1011, 1012, 1013, and 1014, under the control of probe 1020, are placed in gateways 1051, 1052, 1053, and 1054, respectively.

In various embodiments, a VETap is used for data intercepts. For data intercepts, a number of different modes of operation also can be used.

Figure 11:
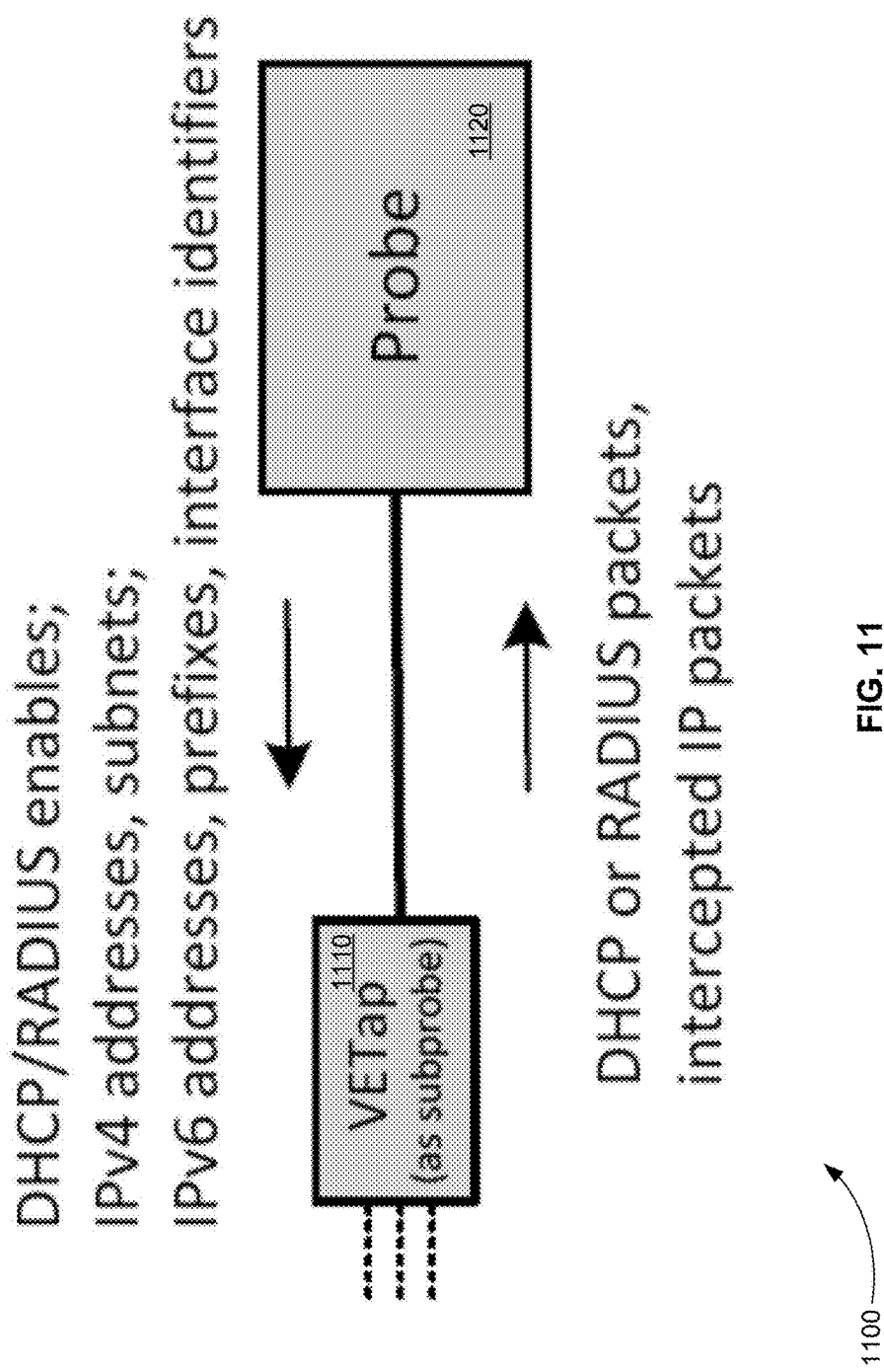
FIG. 11 is an exemplary schematic diagram showing data intercept modes of operation using a VETap and a probe, in accordance with various embodiments.

FIG. 11 is an exemplary schematic diagram 1100 showing data intercept modes of operation using a VETap and a probe, in accordance with various embodiments. For data intercepts, how probe 1120 uses one or more VETaps 1110 depends on the nature of active intercepts in probe 1120. For instance, if one or more intercepts are provisioned as dynamic IP addresses to be assigned by a DHCP server or an AAA server such as RADIUS (e.g., intercept identifier is a media access control (MAC) address that will appear in a DHCP request), probe 1120 requests one or more VETaps 1110 to send all DHCP protocol packets to probe 1120 so that probe 1120 can do the discovery.

As probe 1120 discovers dynamic IP address assignments to intercept targets, or if static IP addresses are being used for targeting, probe 1120 provides the IP addresses (or subnets, etc.) to one or more VETaps 1110.

Because data intercepts involve much higher bandwidths than VoIP intercepts, whether a cloud (e.g., public Internet) can appear between one or more VETaps 1110 and probe 1120 depends on the maximum traffic rates expected.

In various embodiments, a VETap is a software package that is built-in to a manufacturer's network-equipment product to provide required LI capabilities. For instance, in the U.S., the CALEA statute requires that network-equipment manufacturers whose products provide services that are covered by the statute provide means in that equipment to facilitate LI. Some manufactures satisfy this requirement by building in proprietary interfaces for LI mediation systems, but the VETap provides an alternative where the interfaces have already been implemented (by the probe).

Figure 12:
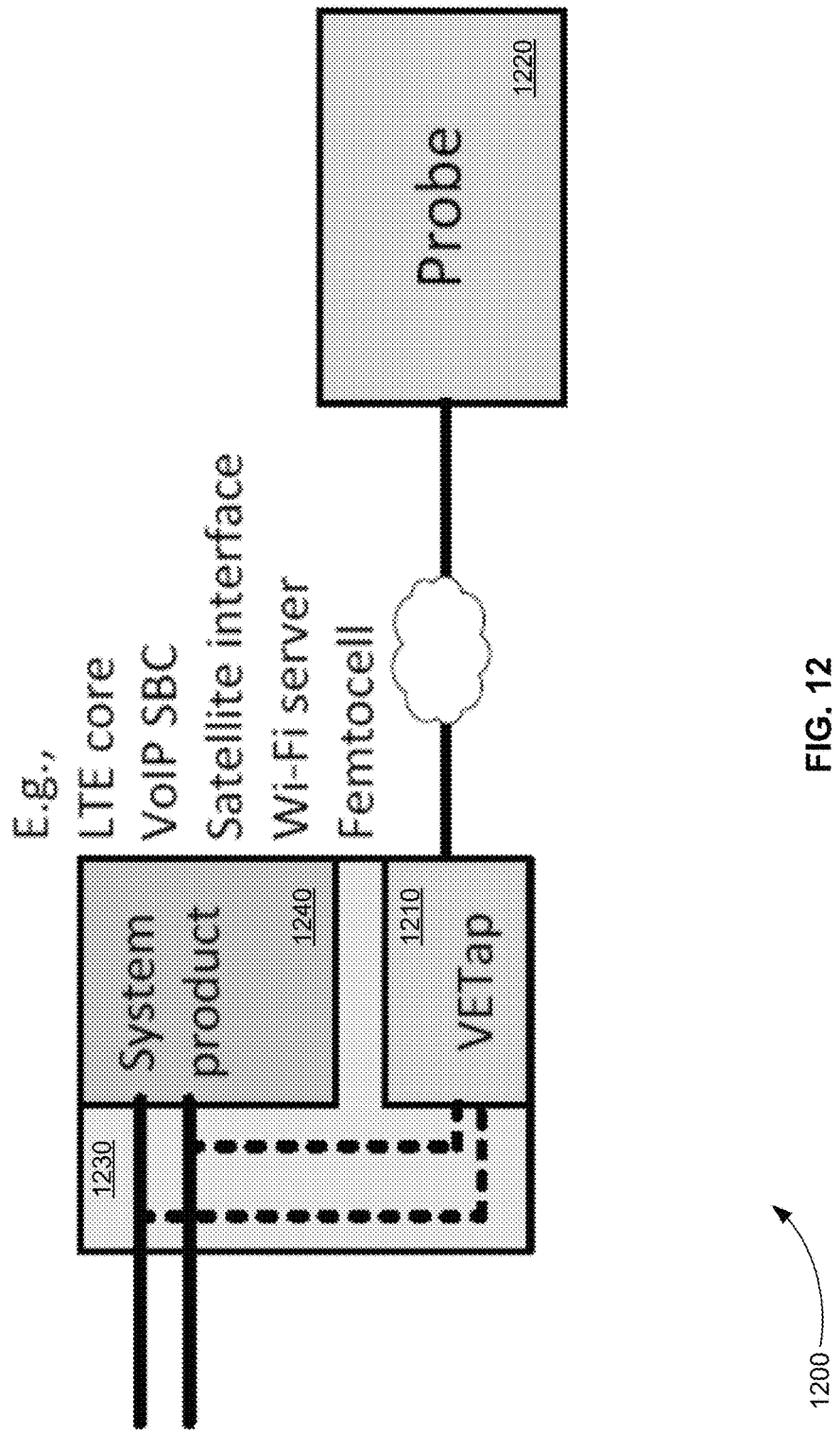
FIG. 12 is an exemplary schematic diagram showing a VETap software package that is built-in to a manufacturer's network-equipment product to provide required LI capabilities, in accordance with various embodiments.

FIG. 12 is an exemplary schematic diagram 1200 showing a VETap software package that is built-in to a manufacturer's network-equipment product to provide required LI capabilities, in accordance with various embodiments. In diagram 1200, VETap 1210 is built-in to network-equipment product 1230. VETap 1210 is still remotely controlled by probe 1220. Network-equipment product 1230 can be, but is not limited to, a long-term evolution (LTE) core, a VoIP session border controller (SBC), a satellite interface, a Wi-Fi server, or a femtocell.

Note that, although VETap 1210 is built-in to network-equipment product 1230, it still accesses the network interfaces of network-equipment product 1230 directly. In other words, unlike the LI software App of the '747 Patent, VETap 1210 does not obtain intercept data through an API with system software product 1240.

In various embodiments, a VETap includes a configuration file. The configuration file is installed on a computer along with the VETap. The configuration file includes, for example, the IP address and transport port of the associated probe. In various embodiments, the configuration file can also specify a gateway address that is used as the route to reach the probe.

The VETap can run in two basic modes: (1) "raw," where all the filtering is done in the VETap process above the Linux kernel, and (2) "kernel," where the filtering is pushed into the kernel using the kernel's Berkeley packet filter. The raw mode is adequate for subprobes and the kernel mode is suggested when there is other software running on the platform. In various embodiments, switching between these two modes is accomplished by simply using the configuration file.

In various embodiments, the configuration file contains numerous other options, such as the names of the network interfaces to tap, the time interval at which the VETap should notify the probe of its presence, some TCP keep-alive parameters, and whether the probe is permitted to reboot the system containing the VETap.

The configuration file can also contain controls for troubleshooting and performance measurement. For example, the PassAll parameter tells the VETap simply to pass a stated percentage of all incoming packets to the probe, and the parameter BuiltInPackets tells the VETap to send a stream of built-in packets to the probe.

In various embodiments, VETaps act as logical extensions of the probe and are not visible at the user interface. For instance, if a VoIP intercept is provisioned on a probe and VETaps are present, the probe automatically reflects these intercepts to the currently discovered VETaps.

In various embodiments, a page in a probe user interface is provided where the probe user can interact with VETaps. This page shows a list of currently discovered VETaps, for example. By selecting one of these VETaps, statistics and a log from the VETap can be downloaded from that VETap and displayed. In various embodiments, the probe also includes an option called the "satellite report," where it produces a file listing the currently connected VETaps.

System for Extending the Listening Capability of a Probe

Figure 13:
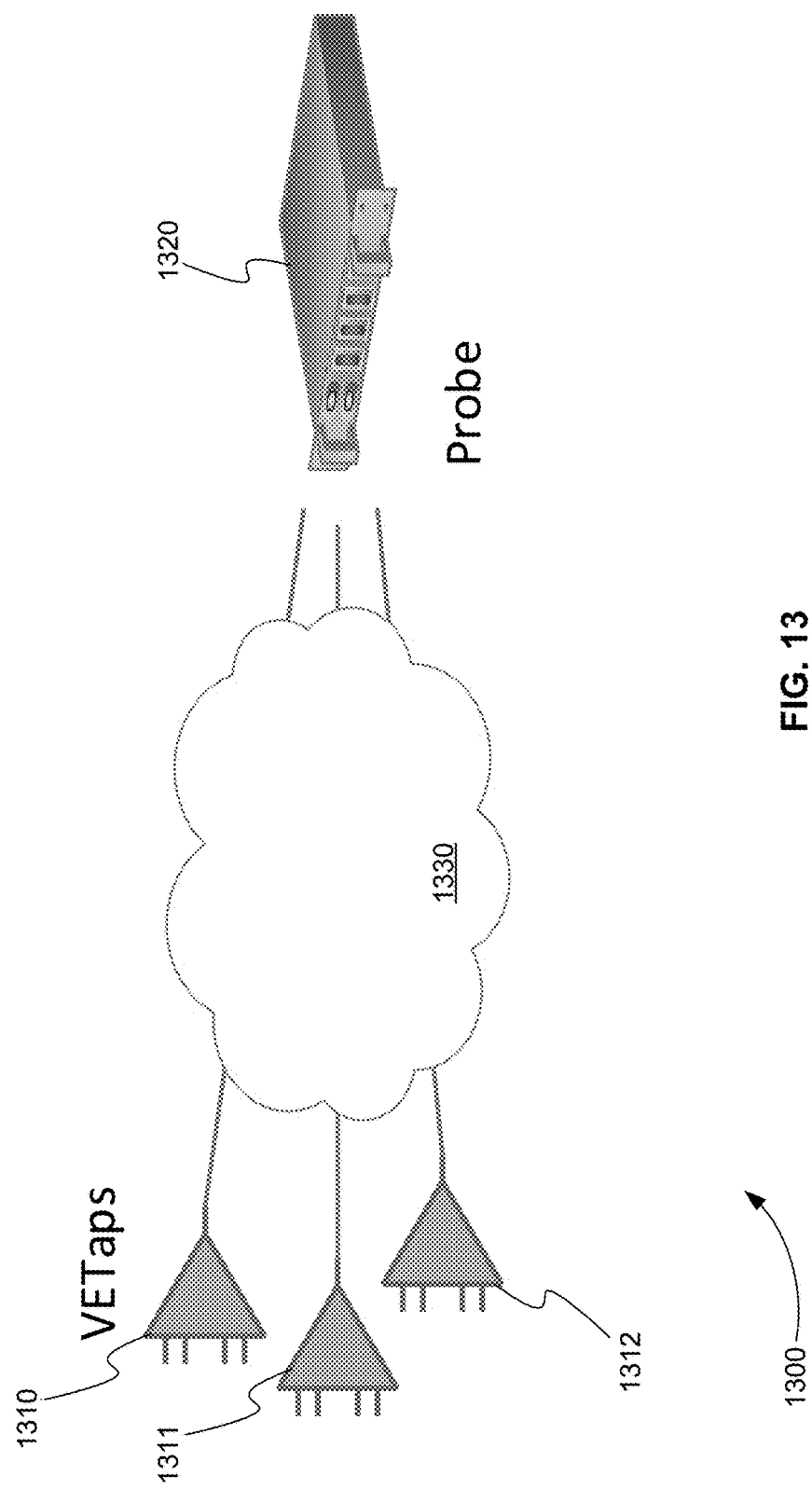
FIG. 13 is a schematic diagram of a system for extending the listening capability of an LI network packet probe beyond the location of the probe, in accordance with various embodiments.

FIG. 13 is a schematic diagram 1300 of a system for extending the listening capability of an LI network packet probe beyond the location of the probe, in accordance with various embodiments. The system of diagram 1300 includes at least one LI network packet software application 1310 and LI network packet probe device 1320.

In various embodiments, the system of diagram 1300 can additionally include LI network packet software applications 1311 and 1312, for example, that are also connected to probe 1320. In various embodiments, probe 1320 can remotely control one software application, a fixed number of software applications, or a dynamic number of software applications.

Probe 1320 is connected to network 1330. Probe 1320 receives authorized interception information from a warrant of an LEA for at least one target user identified in the warrant. The authorized interception information includes identifying information about the at least one target user and the type of network traffic information that is authorized for interception. Probe 1320 creates a set of criteria for interception from the authorized interception information.

At least one application 1310 is a VETap, for example. At least one application 1310 is running on a different networked device (not shown) or a different virtual machine from probe 1320. At least one application 1310 is connected to network 1330 or can be connected to a different network. At least one application 1310 communicates with probe 1320.

At least one application 1310 receives the set of criteria for interception from probe 1320 for the at least one target user. At least one application 1310 monitors network traffic at the Ethernet-frame level to and from the different networked device or virtual machine for packets matching the set of criteria for interception. At least one application 1310 sends copies of information from monitored packets that match the set of criteria for interception to probe 1320 in order to provide intercepted information about the at least one target user to the LEA.

In various embodiments, the system of diagram 1300 further includes a mediation system (not shown). The mediation system receives the authorized interception information from the warrant and sends the authorized interception information to probe 1320. The authorized interception information from the warrant is entered into the mediation system by a human operator using a console terminal, for example. The mediation system then provides the authorized interception information to probe 1320.

In various embodiments, at least one application 1310 reads from a configuration file created for its networked device or virtual machine. The configuration file tells at least one application 1310 which network interfaces it should monitor for possible traffic to be intercepted, and which network interface it should use for communication with its external controlling device (probe 1320).

In various embodiments, probe 1320 sends instructions to at least one application 1310 over network 1330 or over network 1330 and a different network (not shown). In various embodiments, probe 1320 communicates with at least one application 1310 using a proprietary layer or protocol. In various embodiments, probe 1320 communicates with at least one application 1310 using end-to-end encryption.

In various embodiments, at least one application 1310 stores the set of criteria for interception from probe 1320 in a set of tables. The information in the set of criteria for interception determines how at least one application 1310 monitors packets and how it sends information to probe 1320.

For example, if the set of criteria for interception specifies all DHCP packets for interception, at least one application 1310 copies all DHCP packets intercepted and sends all the copied DHCP packets to probe 1320. Probe 1320 filters the copied DHCP packets to provide the information about the at least one target user to the LEA, for example.

If the set of criteria for interception specifies all SIP packets for interception, at least one application 1310 copies all SIP packets intercepted and sends all the copied SIP packets to probe 1320. Probe 1320 filters the copied SIP packets to provide the information about the at least one target user to the LEA, for example.

If the set of criteria for interception specifies at least one identifier of the at least one target user, at least one application 1310 interrogates all packets, copies packets matching the at least one identifier intercepted and sends the copied packets to probe 1320. Probe 1320 provides information from the copied packets about the at least one target user to the LEA, for example. The at least one identifier can include, but is not limited to, a telephone number or an IP address.

If the set of criteria for interception specifies all SIP packets matching the at least one identifier, at least one application 1310 interrogates all SIP packets, copies SIP packets matching the at least one identifier intercepted and sends the copied SIP packets to probe 1320. Probe 1320 provides information from the copied SIP packets about the at least one target user to the LEA, for example.

In various embodiments, at least one application 1310 and probe 1320 are in different VPCs. In various embodiments, at least one application 1310 and probe 1320 are in different virtual machines of a cloud-based computer system.

As described above and in various embodiments, one or more additional LI network packet software applications (e.g., 1311 and 1312) each run on an additional different networked device or virtual machine. Each additional application communicates with probe 1320. Each additional application receives the set of criteria for interception from probe 1320 for the at least one target user. Each additional application monitors network traffic at the Ethernet-frame level to and from the additional different networked device or virtual machine for packets matching the set of criteria for interception. Finally, each additional application sends copies of information from monitored packets that match the set of criteria for interception to probe 1320 in order to provide intercepted information about the at least one target user to the LEA.

In various embodiments, at least one application 1310 further receives commands from probe 1320 to enable or disable itself, to send statistics to probe 1320, to send its log to probe 1320, or to enable or disable encryption in communication with probe 1320.

In various embodiments, the different networked device running at least one application 1310 can include a controller, a computer, a microprocessor, the computer system of FIG. 4, or any device capable of running at least one application 1310 sending and receiving control signals and data over a network.

Method for Extending the Listening Capability of a Probe

Figure 14:
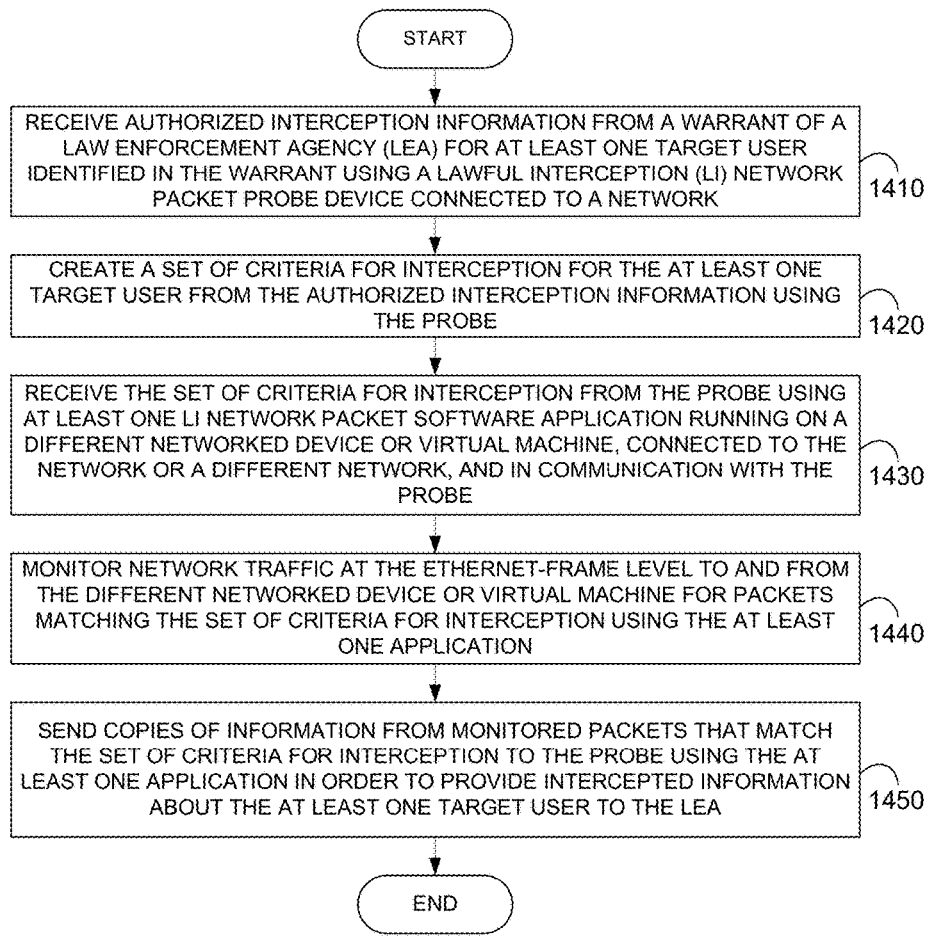
FIG. 14 is a flowchart showing a method for extending the listening capability of an LI network packet probe beyond the location of the probe, in accordance with various embodiments.

FIG. 14 is a flowchart showing a method 1400 for extending the listening capability of an LI network packet probe beyond the location of the probe, in accordance with various embodiments.

In step 1410 of method 1400, authorized interception information from a warrant of a LEA is received for at least one target user identified in the warrant using an LI network packet probe device connected to a network.

In step 1420, a set of criteria for interception is created for the at least one target user from the authorized interception information using the probe.

In step 1430, the set of criteria for interception is received from the probe using at least one LI network packet software application running on a different networked device or virtual machine, connected to the network or a different network, and in communication with the probe.

In step 1440, network traffic is monitored at the Ethernet-frame level to and from the different networked device or virtual machine for packets matching the set of criteria for interception using the at least one application.

In step 1440, copies of information from monitored packets that match the set of criteria for interception are sent to the probe using the at least one application in order to provide intercepted information about the at least one target user to the LEA.

Computer Program Product for Extending the Listening Capability of a Probe

In various embodiments, computer program products include a tangible computer-readable storage medium whose contents include a program with instructions being executed on a processor so as to perform a method for extending the listening capability of a lawful interception (LI) network packet probe beyond the location of the probe. This method is performed by a system that includes one or more distinct software modules.

Figure 15:
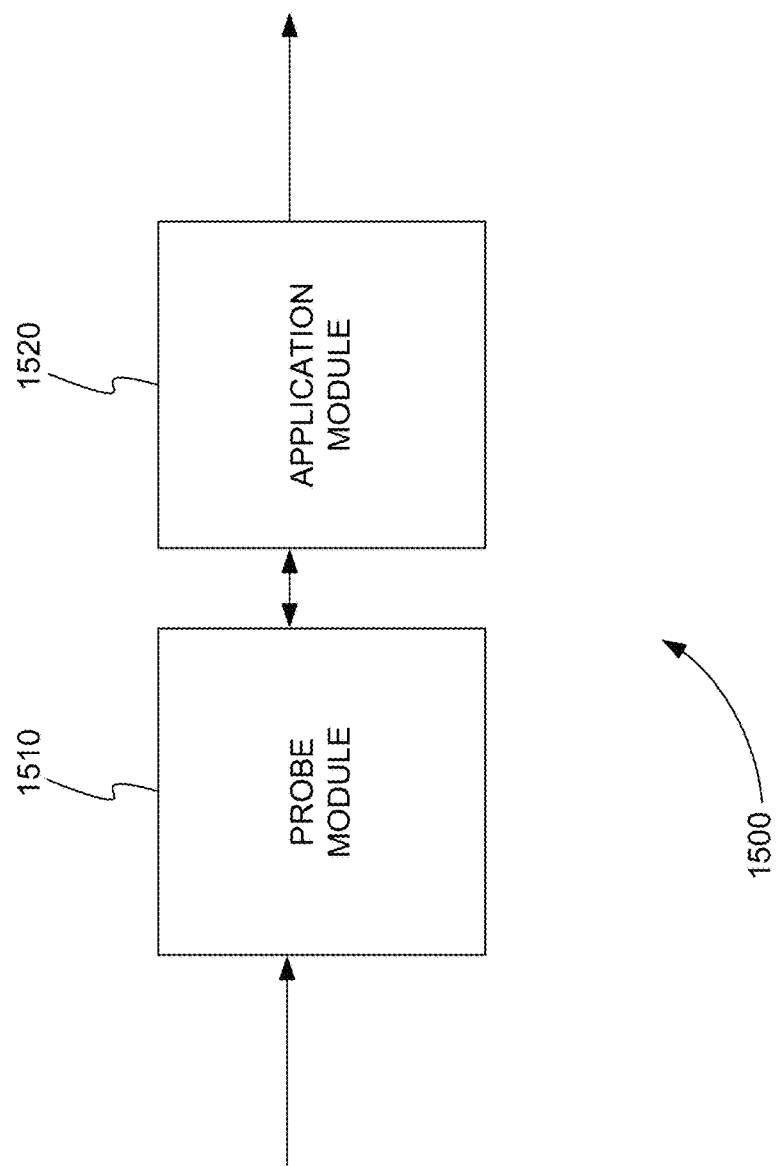
FIG. 15 is a schematic diagram of a system that includes one or more distinct software modules that performs a method for extending the listening capability of an LI network packet probe beyond the location of the probe, in accordance with various embodiments.

FIG. 15 is a schematic diagram of a system 1500 that includes one or more distinct software modules that performs a method for extending the listening capability of an LI network packet probe beyond the location of the probe, in accordance with various embodiments. System 1500 includes probe module 1510 and application module 1520.

Probe module 1510 receives authorized interception information from a warrant of a LEA for at least one target user identified in the warrant running on an LI network packet probe device connected to a network. Probe module 1510 creates a set of criteria for interception for the at least one target user from the authorized interception information.

Application module 1520 receives the set of criteria for interception from the probe. Application module 1520 is running on a different networked device or virtual machine that is connected to the network or a different network and in communication with the probe. Application module 1520 monitors network traffic at the Ethernet-frame level to and from the different networked device or virtual machine for packets matching the set of criteria for interception. Application module 1520 sends copies of information from monitored packets that match the set of criteria for interception to the probe in order to provide intercepted information about the at least one target user to the LEA.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for extending the listening capability of a lawful interception (LI) network packet probe beyond the location of the probe, comprising:

an LI network packet probe device connected to a network that receives authorized interception information from a mediation system that receives warrant information entered in the mediation system from a warrant of a law enforcement agency (LEA) for at least one target user identified in the warrant and creates a set of criteria for interception from the authorized interception information; and at least one LI network packet software application running on a different networked device or virtual machine and connected to the network or different network that communicates with the probe, receives the set of criteria for interception from the probe for the at least one target user, monitors network traffic at the Ethernet-frame level to and from the different networked device or virtual machine for packets matching the set of criteria for interception, and sends copies of information from monitored packets that match the set of criteria for interception to the probe that, in turn, communicates intercepted information about the at least one target user to the mediation system that presents the intercepted information to the LEA, wherein the at least one LI network packet software application does not include communications functions for communicating the information from monitored packets directly to the mediation system for the LEA and instead relies on the probe for the communication functions.

2. The system of claim 1, wherein the set of criteria for interception comprises all host configuration protocol (DHCP) packets, the copies of information comprises copies of all DHCP packets, and the probe filters the copies of all DHCP packets to provide the information about the at least one target user to the LEA.

3. The system of claim 1, wherein the set of criteria for interception comprises all session initiation protocol (SIP) packets, the copies of information comprises copies of all SIP packets, and the probe filters the copies of all SIP packets to provide the information about the at least one target user to the LEA.

4. The system of claim 1, wherein the set of criteria for interception comprises at least one identifier of the at least one target user.

5. The system of claim 4, wherein the at least one identifier comprises a telephone number.

6. The system of claim 4, wherein the at least one identifier comprises an IP address.

7. The system of claim 4, wherein the copies of information comprises copies of information from packets matching the at least one identifier and the probe provides the copies of information from packets matching the at least one identifier to the LEA.

8. The system of claim 1, wherein the set of criteria for interception comprises all session initiation protocol (SIP) packets matching the at least one identifier, the copies of information comprises copies of the matching SIP packets, and the probe provides information from the copies of the matching SIP packets to the LEA.

9. The system of claim 1, wherein the at least one application communicates with probe over the network.

10. The system of claim 1, wherein the at least one application communicates with probe over the network and the different network.

11. The system of claim 1, wherein the at least one application communicates with probe using a proprietary layer or protocol.

12. The system of claim 1, wherein the at least one application communicates with probe using end-to-end encryption.

13. The system of claim 1, wherein the at least one application further reads from a configuration file that specifies network interfaces of the different networked device or virtual machine to be monitored and specifies a network interface of the different networked device or virtual machine to be used for communication with the probe.

14. The system of claim 1, wherein the at least one application and the probe are in different virtual private clouds (VPCs).

15. The system of claim 1, wherein the at least one application and the probe are in different virtual machines of a cloud-based computer system.

16. The system of claim 1, further comprising one or more additional LI network packet software applications that each run on an additional different networked device or virtual machine and that each communicates with the probe,
    receives the set of criteria for interception from the probe for the at least one target user,
    monitors network traffic at the Ethernet-frame level to and from the additional different networked device or virtual machine for packets matching the set of criteria for interception, and
    sends copies of information from monitored packets that match the set of criteria for interception to the probe that, in turn, communicates intercepted information about the at least one target user to the mediation system that presents the intercepted information to the LEA, wherein each of the one or more LI network packet software applications does not include communications functions for communicating the information from monitored packets directly to the mediation system for the LEA and instead relies on the probe for the communication functions.

17. The system of claim 1, wherein the at least one application further receives commands from the probe to enable or disable itself, to send statistics to the probe, to send its log to the probe, or to enable or disable encryption in communication with the probe.

18. A method for extending the listening capability of a lawful interception (LI) network packet probe beyond the location of the probe, comprising:
    receiving authorized interception information from a mediation system that receives warrant information entered in the mediation system from a warrant of a law enforcement agency (LEA) for at least one target user identified in the warrant using an LI network packet probe device connected to a network;
    creating a set of criteria for interception for the at least one target user from the authorized interception information using the probe;
    receiving the set of criteria for interception from the probe using at least one LI network packet software application running on a different networked device or virtual machine, connected to the network or a different network, and in communication with the probe;
    monitoring network traffic at the Ethernet-frame level to and from the different networked device or virtual machine for packets matching the set of criteria for interception using the at least one application; and
    sending copies of information from monitored packets that match the set of criteria for interception to the probe using the at least one application, wherein the probe, in turn, communicates intercepted information about the at least one target user to the mediation system that presents the intercepted information to the LEA and wherein the at least one LI network packet software application does not include communications functions for communicating the information from monitored packets directly to the mediation system for the LEA and instead relies on the probe for the communication functions.

19. The method of claim 18, wherein the set of criteria for interception comprises all host configuration protocol (DHCP) packets, all session initiation protocol (SIP) packets, or at least one identifier of the at least one target user.

20. A computer program product, comprising a non-transitory and tangible computer-readable storage medium whose contents include a program with instructions being executed on a processor so as to perform a method for extending the listening capability of a lawful interception (LI) network packet probe beyond the location of the probe, the method comprising:
    providing a system, wherein the system comprises one or more distinct software modules, and wherein the distinct software modules comprise a probe module and an application module;
    receiving authorized interception information from a mediation system that receives warrant information entered in the mediation system from a warrant of a law enforcement agency (LEA) for at least one target user identified in the warrant using the probe module running on an LI network packet probe device connected to a network;
    creating a set of criteria for interception for the at least one target user from the authorized interception information using the probe module;

receiving the set of criteria for interception from the probe using the application module running on a different networked device or virtual machine that is connected to the network or a different network and in communication with the probe;

monitoring network traffic at the Ethernet-frame level to and from the different networked device or virtual machine for packets matching the set of criteria for interception using the application module; and sending copies of information from monitored packets that match the set of criteria for interception to the probe using the application module, wherein the probe, in turn, communicates intercepted information about the at least one target user to the mediation system that presents the intercepted information to the LEA and wherein the at least one LI network packet software application does not include communications functions for communicating the information from monitored packets directly to the mediation system for the LEA and instead relies on the probe for the communication functions.

* * * * *

UNITED STATES PATENT AND TRADEMARK OFFICE
CERTIFICATE OF CORRECTION

PATENT NO. : 10,462,190 B1
APPLICATION NO. : 16/398820
DATED : October 29, 2019
INVENTOR(S) : Glenford J. Myers Page 1 of 1

It is certified that error appears in the above-identified patent and that said Letters Patent is hereby corrected as shown below:

On the Title Page

Item (71):
"Couter Link" should read --Counter Link--

Signed and Sealed this
Twenty-fourth Day of December, 2019

Andrei Iancu
*Director of the United States Patent and Trademark Office*